Jan. 4, 1949. J. ROME 2,458,031
SAND SPREADING AND LOADING DEVICE
Filed Jan. 28, 1947 2 Sheets-Sheet 2
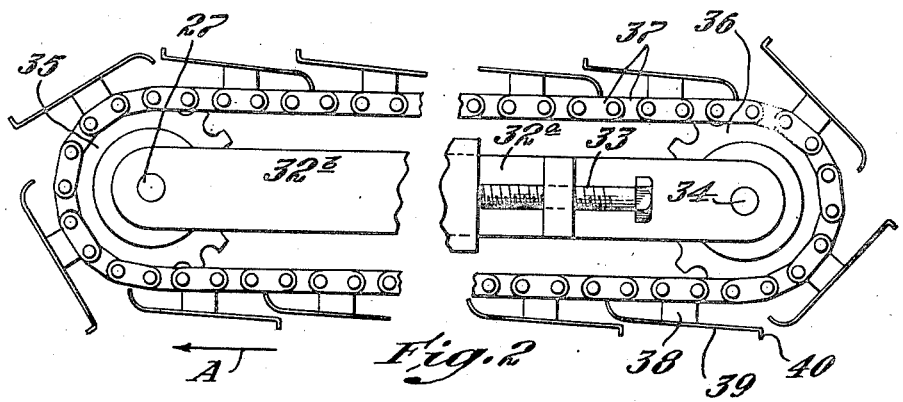
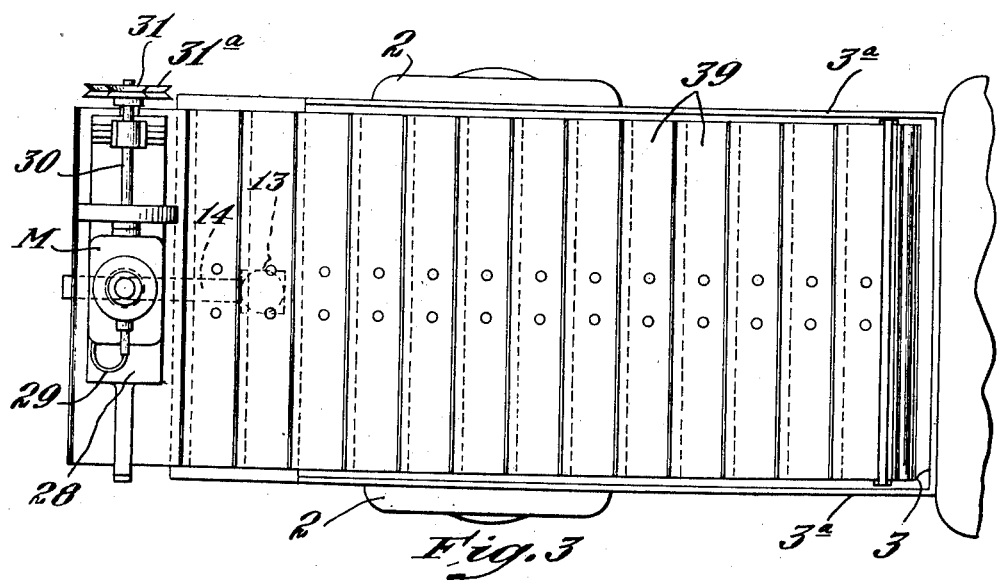
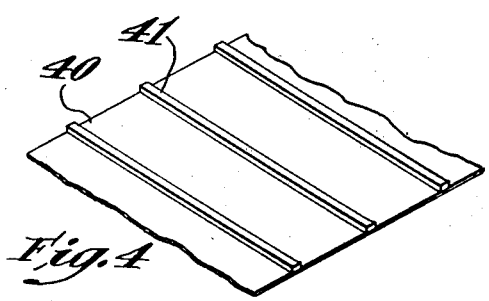
Inventor
Joseph Rome Patented Jan. 4, 1949

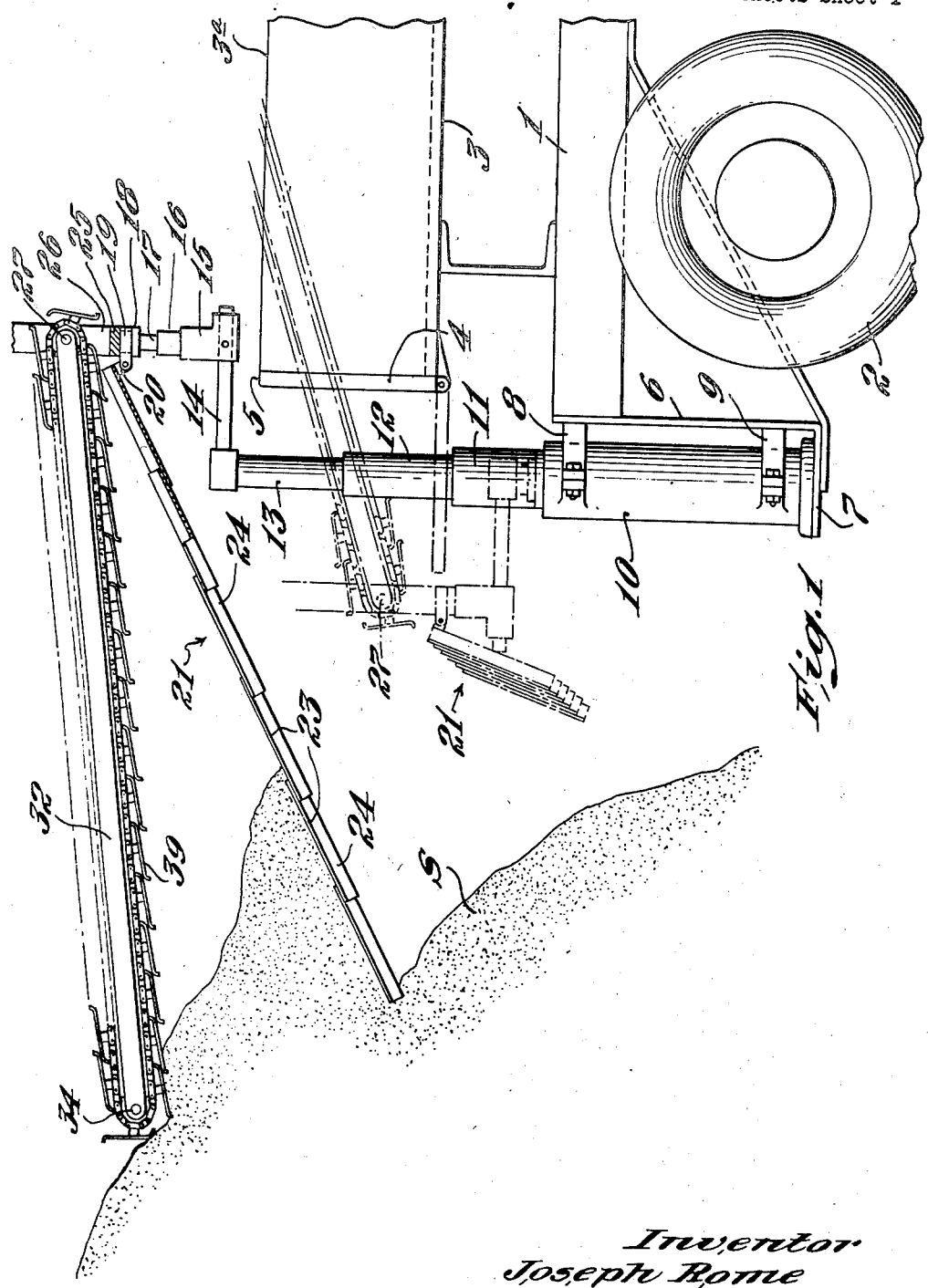

2,458,031

UNITED STATES PATENT OFFICE 2,458,031

SAND SPREADING AND LOADING DEVICE

Joseph Rome, Barre, Vt.

Application January 28, 1947, Serial No. 724,915

11 Claims. (Cl. 214—83.14)

This invention pertains to a combined sand-spreading and loading device for use with automobile trucks, tractors, trailers or other vehicles. One object of the invention is to provide a sand-spreading device applicable to a conventional vehicle, for instance an auto-truck and by means of which sand from a supply carried by the vehicle may be spread uniformly over the road surface at the rear of the vehicle as the latter proceeds. A further object is to provide sand-spreading means operative to deliver the sand at a substantially uniform rate from a diminishing supply. A further object is to provide a sand-spreading device which is dependable in operation even though the sand be of non-uniform grain size; contaminated with clay or other impurities; and/or wet. A further object is to provide a device which may be employed alternatively to deliver sand from a vehicle or to load sand into the vehicle. A further object is to provide a combined spreader and loader which may readily be shifted between two different operative positions relatively to the vehicle body, thereby to enable it to perform its alternative functions. A further object is to provide a simple but rugged and reliable apparatus for spreading and loading sand. Other and further objects and advantages of the invention will be pointed out in the following more detailed description and by reference to the accompanying drawings wherein:

Fig. 1 is a fragmentary side elevation showing the rear portion of a conventional auto-truck with the sand-loading and spreading device of the present invention mounted thereon, the device being illustrated in the loading position in full lines and in the spreading position in broken lines;

Fig. 2 is a fragmentary side elevation of the sand-transfer means forming a portion of the improved device;

Fig. 3 is a fragmentary plan of the parts shown in Fig. 1, but with the device of the present invention arranged in the sand-spreading position; and Fig. 4 is a fragmentary perspective view illustrating a modified sand-transfer means.

Referring to the drawings the numeral 1 designates the chassis of a motor truck of conventional type. This chassis is mounted upon wheels 2 and carries the body having the floor 3, the side walls 3ª, and the tail gate 4 whose upper edge is indicated at 5. This tail gate may be swung down to horizontal position to facilitate unloading.

In accordance with the present invention a bracket 6 is secured to the rear end of the truck chassis. This bracket has the horizontal supporting portion or shelf 7 and is provided with rearwardly directed lugs 8 and 9 designed partially to embrace and to be bolted to the lower, outer cylinder 10 of an expansible hydraulic jack. This jack, as illustrated, comprises the telescopic inner cylinders 11 and 12 and the vertically movable post 13. The jack provides for a very substantial vertical movement of the upper end of the post 13. The jack may be actuated by hand, by the operation of a suitable lever (not shown), or by connection to a motor-driven pump.

The post 13 carries a horizontal arm 14, and as the post 13 may be rotated within the cylinder 12, the arm 14 may be arranged to project forwardly from the axis of the post or rearwardly, as desired. In the position shown in Fig. 1, the arm 14 is located above the level of the top edge 5 of the tail gate of the truck and extends forwardly from the axis of the post 13. The post 13 is arranged substantially midway of the width of the truck body so that when the arm 14 is positioned as shown in Fig. 1, it is substantially midway between the planes of sides 3ª of the truck body. Mounted on the arm 14, for adjustment lengthwise of the latter, is an auxiliary jack 15, also of the expansible type, comprising the telescopic inner cylinder 16 and the vertically movable post 17. This jack may likewise be operated by hand or by a power-driven pump. The post 17 is provided with a flange 18 which forms a support for a collar 19 having ears which receive a pivot pin on which is pivoted a lug 20 projecting downwardly from the upper end of an elongate chute 21 of a width substantially equal to the distance between the sides 3ª of the truck body. This chute comprises a plurality of telescopically connected plates 23 having reinforcing downwardly directed side flanges 24. This chute may be extended, as illustrated in full lines in Fig. 1, or may be collapsed when not in use, as shown in broken lines in Fig. 1. When extended, this chute is of substantial length, for instance it may be of a length approximating that of the truck body. As shown in Fig. 1 the chute extends downwardly and rearwardly from its pivotal connection to the post 17 and its free or rear end is resting upon a pile S of sand.

Above the collar 19 the post 17 carries a frame comprising the lower transverse member 25 and vertical side members 26, the latter being connected at their upper ends by a cross rail 28. A motor M (Fig. 3) is mounted on the cross rail 28. It may be an electric motor receiving current from the vehicle battery or generator through a flexible conductor 29, or it may be an independent gasoline engine, or any other prime mover. This motor has a shaft 30 provided at one end with a pulley 31.

A second shaft 27 (Fig. 1) parallel to the motor shaft 30, is journaled in bearings in the side members 26 of the frame and is provided at one end with a pulley 31ᵃ which is connected by a belt to the pulley 31 so that operation of the motor M turns the shaft 27. The shaft 27 forms a horizontal pivotal support for one end of an elongate rigid arm or carrier 32. This carrier or arm preferably comprises telescopic sections 32ᵃ and 32ᵇ (Fig. 2) which may be relatively adjusted by means of screws 33 to vary the effective length of the carrier or arm. Preferably this carrier or arm is of a length approximating that of the truck body. The carrier or arm 32 is provided at its free end with a transverse shaft 34 (Figs. 1 and 2) parallel to the shaft 27 and these shafts carry sprocket wheels 35 and 36. An endless chain, comprising pivotally connected links 37, embrace the sprockets 35 and 36. By adjustment of the screws 32 this chain may be properly tightened. If desired, supporting sprockets (not shown) may be arranged at suitable intervals along the carrier 32 for supporting the chain between the sprockets 35 and 36. The shaft 27 is driven in such a direction that the lower run of the chain always moves toward the shaft 27, as indicated for example by the arrow A in Fig. 2. The current for the motor M may be controlled by a suitable switch located conveniently to the operator of the vehicle and when this switch is closed the shaft 27 is rotated and the lower run of the chain moves in the direction of the arrow A, as just described.

Recurrent links of the endless chain have outstanding brackets 38 to which are secured scraper blades 39. These blades are of stiff sheet material, for example stainless steel, each comprising an elongate body portion of a width such as to reach substantially from one side wall 3ᵃ to the other of the truck body, when the transfer device, comprising the carrier 32 and the chain with its blades, is disposed in the unloading position indicated in broken lines in Fig. 1. The body portion of each blade 39 is inclined with relation to the path of travel of the chain, the inclination being such that in the lower run of the chain the body portion of the blade inclines forwardly and toward the chain. The forward edge of each blade is preferably curved so as to contact the lower run of the chain while the rearward portion 40 of each blade is bent in the opposite direction so that, in the lower run of the chain, the downwardly bent lower edges constitute scraper elements for engagement with the sand which is to be transferred.

While the endless link chain, with its specially shaped scraper blades, is preferred as a means for moving the sand, it is contemplated that other means may be employed, such for example as the endless flexible belt 40 (Fig. 4) having transversely extending cleats 41 which act as the scraper elements.

To facilitate the shifting of the carrier 32 from loading to unloading position, and vice versa, the vehicle may be equipped with any suitable type of hoist or crane (not shown), but this is not essential to the invention, since the shifting of the carrier may be accomplished manually.

In the operation and assuming that the apparatus has been secured to the rear of the truck, as above described, and that it is desired to load the truck with sand, the truck is backed up to the sand pile S and the chute 21 is extended and its rear end is arranged to rest upon the sand. The carrier 32 is also extended rearwardly and its free end portion is allowed to rest upon the sand pile above the lower end of the chute. When the shaft 27 is rotated, the lower run of the chain moves to the right (as viewed in Fig. 1) and the blades 39 scrape off sand from the pile and cause it to fall onto the lower end of the chute. Gradually the free end of the carrier 32 descends until the blades 39 are so related to the sand resting upon the chute that they scrape the sand upwardly along the chute until it falls from the upper end of the chute into the truck. This operation continues until the truck is loaded. When the truck has been loaded, the chute 21 is collapsed and the post 13 is turned so that the arm 14 extends rearwardly while the carrier 32 extends forwardly and rests upon the load of sand in the truck. If it now be desired to scatter the sand on the roadway, the jacks are lowered until the arm 14 is between the level of the floor of the truck, as shown in broken lines in Fig. 1. The tail gate is now opened, and as the truck advances the shaft 27 is rotated and the scraper blades 39 gradually draw sand from the pile in the truck body and carry it rearwardly so that it is delivered onto the roadway.

If instead of scattering the sand, it be desired to deliver it to a particular point, the chute 21 may be extended so that the sand removed from the truck body falls on the chute and slides down the latter, the truck remaining stationary.

It may be noted that whether in loading or unloading most of the weight of the carrier with its chain and blades is supported by the body of sand which is to be transferred. As the body of sand diminishes, the carrier swings downwardly about the shaft 27 as an axis so that the blades of the transfer device continue to drag along the upper surface of the sand body and thus to deliver sand until the supply is exhausted. The blades 39 are preferably somewhat flexible and resilient and thus are effective even though the sand is not of uniform grain size and even though the sand may contain impurities, such for example as clay.

The device as thus provided is applicable to conventional trucks without substantial change in the truck structure; it may readily be removed when desired; and it is useful both in loading sand into the truck and in distributing the sand over the surface of the roadway. It is easily manipulated and is of strong and durable construction and comprises comparatively few parts, so that it may be made at a reasonable cost and is thus available for general use.

While one desirable embodiment of the invention has been illustrated and described by way of example, it is to be understood that the invention is broadly inclusive of any and all modifications falling within the scope of the appended claims.

I claim:

1. A sand-handling device for use with a motor truck, said device comprising a collapsible chute, a support for attachment to the rear end of the truck, means pivotally attaching the forward end of the chute to the support, the support being vertically adjustable to an extent such that the forward end of the chute may, at will, be located above the level of the top of the tail gate of the truck or below the level of the floor of the truck, and sand-transfer means also connected to said vertically adjustable support.

2. A sand-handling device for use with a motor truck, said device comprising a chute, means mounted on the rear end of the truck for vertically adjusting said support, said means including a post whose axis is disposed rearwardly of the tail gate of the truck, a horizontal arm projecting from the upper part of the post, said arm being located above the level of the upper edge of the tail gate, the support being mounted upon said arm, means pivotally attaching the free end of the chute to the support, a sand-transfer device, and means pivotally attaching the forward end of the sand-transfer device to the support at a point above the forward end of the chute, the transfer device comprising a part which moves forwardly along the chute and which is designed to move sand upwardly along the chute and to deliver it into the truck.

3. A sand-handling device for use with a motor truck, said device comprising a chute, a bracket for attachment to the rear end of the truck, said bracket supporting a vertically rotatable post whose axis is rearward of the tail gate of the truck, a horizontal arm carried by the post, said arm, in one position of adjustment of the post, extending forwardly and above the upper edge of the tail gate of the truck and in another position of the post extending rearwardly and below the level of the floor of the truck, a support mounted on the arm, means pivotally attaching the forward end of the chute to said support and sand-transfer means which includes an elongate rigid arm also connected to said support.

4. A sand-handling device for use with a motor truck said device comprising a jack for attachment to the rear end of the truck, said jack comprising a rotatable post whose axis is located rearwardly of the tail gate of the truck, a horizontal arm secured to the upper part of said post, a support adjustable along said arm, a sand-transfer device including an elongate rigid extensible carrier, means for attaching said carrier to the support, the post being vertically adjustable to a degree sufficient to permit location of the horizontal arm above the upper edge of the tail gate or below the level of the truck floor respectively, and means for actuating the sand-transfer device.

5. A sand-transfer device for use with a motor truck, said device comprising an endless carrier and scraper blades carried thereby, means so supporting the transfer device that it will move sand either forwardly or rearwardly, alternatively, relatively to the truck body, a chute cooperative with the transfer device, when the latter is arranged to move the sand forwardly, thereby to deliver the sand into the truck, the chute being collapsible, and means for supporting the chute in collapsed condition during delivery of sand onto the road at the rear of the truck.

6. A sand-handling device for use with a motor truck, comprising a chute and means for supporting it at the rear end of the truck, and sand-transfer means operative alternatively to move sand forwardly or rearwardly relatively to the truck, the chute cooperating with the transfer means when the latter is arranged to move sand forwardly thereby to deliver sand from a supply into the truck, the chute being collapsible, and means for supporting the chute in collapsed, inoperative position while the transfer device moves sand rearwardly for delivery onto the roadway.

7. A sand-handling device for use with a motor truck, said device comprising a support and means for connecting it to the rear end of the truck, an elongate carrier pivoted at one end to swing about a horizontal axis carried by the support, the support being adjustable so that, at will, the free end of the carried may rest upon a supply of sand located rearwardly of the truck or upon a load of sand within the truck body, respectively, sand-moving means on the carrier, means for driving the sand-moving means so that it moves sand toward the pivotal axis of the carrier, the free end of the carrier dropping gradually as the supply of sand diminishes, and means for adjusting the support so that the pivoted end of the carrier may be located above and forwardly of the upper edge of the tail gate of the truck or below the level of the floor of the truck respectively.

8. A sand-handling device for use with a motor truck, said device comprising a support and means for connecting it to the rear end of the truck, an elongate rigid carrier pivoted at one end to swing about a horizontal axis carried by the support, the support being adjustable so that, at will, the free end of the carrier may rest upon a supply of sand located rearwardly of the truck or upon a load of sand within the truck body respectively, sand-moving means on the carrier, means for driving the sand-moving means so that it moves sand toward the pivotal axis of the carrier, the free end of the carrier dropping gradually as the supply of sand diminishes, the means for connecting the support to the truck including a jack, said jack being so constructed and arranged that the pivotal axis of the carrier may be moved from above the level of the top edge of the tail gate of the truck to a point below the level of the floor of the truck, the support being movable from a point forwardly to a point rearwardly of the tail gate.

9. A sand-handling device for use with a motor truck, said device comprising a support and means for connecting it to the rear end of the truck, an elongate rigid carrier pivoted at one end to swing about a horizontal axis carried by the support, the support being adjustable so that, at will, the free end of the carrier may rest upon a supply of sand located rearwardly of the truck or upon a load of sand within the truck body respectively, sand-moving means on the carrier, means for driving the sand-moving means so that it moves sand toward the pivotal axis of the carrier, the free end of the carrier dropping gradually as the supply of sand diminishes, and means for connecting the support to the truck including a jack having a vertically movable post whose axis is rearward of the tail gate of the truck, said post having a horizontal arm at its upper end and being rotatable so that the arm may extend forwardly or rearwardly from the post, an auxiliary jack mounted for adjustment lengthwise of the arm, the auxiliary jack including a vertically movable post on which said support is mounted, the jacks being so constructed and arranged that the pivotal axis of the carrier may be moved from a position above and forward of the tail gate to a position below the level of the floor of the truck and rearwardly of the tail gate.

10. In combination with a motor truck, means operative to load sand from a supply thereof into the truck, said means including an endless conveyor and a chute, and means supporting the forward end of each to swing freely about a horizontal axis adjacent to the rear end of the truck with their rear ends unsupported and free to be placed independently of each other at different heightwise positions against the supply of sand.

11. In combination with a motor truck, means including an endless conveyor and a chute cooperative to load sand from a pile of sand into the truck, means supporting the forward ends of the conveyor and chute, to swing freely about horizontal axes, adjacent to the rear end of the truck with their rear ends unsupported and free to be placed independently of each other at different heightwise positions against the pile of sand, said chute being adjustable in length to permit bringing the free end thereof into engagement with any part of the pile beneath the conveyor without moving the truck relative to the pile.

JOSEPH ROME.

REFERENCES CITED

The following references are of record in the file of this patent:

UNITED STATES PATENTS

| Number | Name | Date |
|---|---|---|
| 488,680 | Rix | Dec. 27, 1892 |
| 1,226,573 | Nelson | May 15, 1917 |
| 1,505,476 | London | Aug. 19, 1924 |
| 1,573,125 | Robbins | Feb. 16, 1926 |
| 1,949,861 | Call | Mar. 6, 1934 |
| 2,332,729 | Klosterman | Oct. 26, 1943 |
| 2,381,892 | Fees | Aug. 14, 1945 |
| 2,389,483 | Bobrowski et al. | Nov. 20, 1945 |
| 2,401,465 | Cwicig | June 4, 1946 |
| 2,410,996 | Patterson | Nov. 12, 1946 |